United States Patent Office
3,635,949
Patented Jan. 18, 1972

3,635,949
METHOD FOR THE PRODUCTION OF 7-CHLORO-2-METHYLAMINO - 5-PHENYL-5H - 1,4-BENZO-DIAZEPINE - 4 - OXIDE, AND 7 - CHLORO-2-METHYL-AMINO - 5 - PHENYL-3H-1,4-BENZO-DIAZEPINE-4-OXIDE
Torben Torsbjerg Moller, Aarhus, Poul Nedenskov, Birkerod, and Henning B. Rasmussen, Logten, Denmark, assignors to Aktieselskabet Grindstedvaerket, Aarhus, Denmark
No Drawing. Filed Sept. 16, 1968, Ser. No. 760,088
Claims priority, application Denmark, Oct. 19, 1967, 5,198/67
Int. Cl. C07d 53/06
U.S. Cl. 260—239 BD
1 Claim

ABSTRACT OF THE DISCLOSURE

The invention relates to the novel 7-chloro-2-methyl-amino-5-phenyl-5H-1,4-benzodiazepine-4-oxide (I), to the production thereof by oxidizing 7-chloro-2-methyl-amino-4 - hydroxy - 5 - phenyl - 4,5 - dihydro - 3H - 1,4 - benzodiazepine, the reaction product being subjected to fractional crystallisation to recover (I), and to the conversion of (I) into 7 - chloro - 2 - methylamino-5-phenyl-3H-1,4-benzodiazepine-4-oxide (II) by heating the reaction product from the said oxidation in alkaline solution.

---

The invention relates to the hitherto unknown 7-chloro-2-methylamino-5-phenyl-5H-1,4-benzodiazepine-4-oxide of the following formula

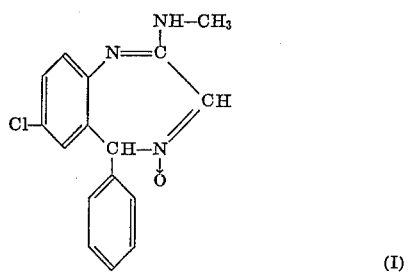

(I)

belonging to the known group of 1,4-benzodiazepine-4-oxides, having a sedative effect, the best known representative of which being 7-chloro-2-methylamino-5-phenyl-3H-1,4 - benzodiazepine - 4 - oxide (II), to the production of the new compound (I), and, if desired, to the transformation of (I) into (II).

The characterizing feature of the present method is that 7 - chloro-2-methylamino-4-hydroxy-5-phenyl-4,5-dihydro-3H-1,4-benzodiazepine is oxidised, after which the oxidation product, containing a mixture of (I) and (II), is fractionally crystallized for the recovering of (I) or, if desired, heated in alkaline solution to transform (I) into (II) to recover the latter.

The starting material has been described in the literature. As an oxidizing agent may be used HgO, $$K_3Fe(CN)_6$$

$H_2O_2$, NaOCl, diethylazodicarboxylate, or m-chloro-perbenzoic acid. According to the nature of the oxidizing agent, the oxidation may be carried out in neutral, acid, or basic medium. Thus, the oxidation with $K_3Fe(CN)_6$ proceeds best in a basic medium, and with NaOCl best in acid medium, whereas oxidation with diethylazo-dicarboxylate proceeds in a neutral medium.

We have found that the oxidation with any of the said oxidizing agents results in a mixture of the compounds (I) and (II). The character of the oxidizing agent, and the acidity of reaction medium are of major importance for the ratio between (I) and (II), making it possible to obtain ratios between (I) and (II) ranging from 4:1 to 3:4, as desired. The mixture of (I) and (II) can be isolated by filtration, or by extraction of the reaction mixture with an organic solvent for the two compounds, for instance methylene chloride. Afterwards, (I) and (II) can be separated from one another by fractional crystallization from for instance ethanol, whereby (I) can be recovered from a 3:1 mixture in a yield of about 70%.

If it is desired to convert (I) into (II), the mixture recovered from the reaction is dissolved, for instance, in ethanol which has been made alkaline with for instance $$NaOCH_3$$

or NaOH, the solution being refluxed. This results in an isomerisation, after which (II) can be recovered in a yield of up to 90%.

Heating in organic bases, for instance pyridine, also gives isomerisation.

The following examples are illustrative of the present method.

EXAMPLE 1

2.0 g. of 7-chloro-2-methylamino-4-hydroxy-5-phenyl-4,5-dihydro-3H-1,4-benzodiazepine are dissolved in 50 ml. of acetone, and a solution of 4.35 g. of $K_3Fe(CN)_6$ and 1.11 g. of $NaHCO_3$ in 34 ml. of water is added with careful mixing. The mixture is left in the dark for 15 hours, whereby $K_3NaFe(CN)_6$ crystallizes, and is removed. Then, 100 ml. of methylene chloride are added and the organic phase is separated from the aqueous phase. The latter is further extracted with 10 ml. of methylene chloride, the extract being united with the organic phase. The latter is then washed with 25 ml. of water, dried over $MgSO_4$, and evaporated to dryness, yielding 2.28 g. of a mixture of 7 - chloro - 2 - methylamino - 5 - phenyl - 5H - 1,4 - benzodiazepine-4-oxide (I), and 7-chloro-2-methylamino-5-phenyl-3H-1,4-benzodiazepine-4-oxide (II).

A fractional crystallization of this mixture from ethanol yields about 70% of (I), melting at 210–212° C.

Calculated for $C_{16}H_{14}N_3OCl$ (percent): C, 64.1; H, 4.7; N, 14.0; Cl, 12.2. Found (percent): C, 64.1; H, 4.8; N, 13.8; Cl, 12.0.

EXAMPLE 2

The procedure of Example 1 is repeated, except that instead of subjecting the mixture of (I) and (II) to fractional crystallization, 2.28 g. of the mixture are dissolved in 50 ml. of 96% ethanol, and 1.08 g. of $NaOCH_3$ are added, after which the solution is refluxed for 7 hours. After evaporation to dryness, the residue is heated to boiling with 75 ml. of methylene chloride. The cooled solution is washed with two 25 ml. portions of water, dried over $MgSO_4$, and evaporated to dryness. By dissolving the residue in 10 ml. of acetone, filtering, crystallization, and recrystallization from ethanol, 1.26 g. of (II) with melting point 236° C. are recovered.

From the parent lye, a further 0.3 g. can be recovered to bring the total yield of (II) up to about 80%.

EXAMPLE 3

0.5 g. of 7-chloro-2-methylamino-4-hydroxy-5-phenyl-4,5-dihydro-3H-1,4-benzodiazepine are dissolved in 15 ml. of acetone, and 0.50 ml. of glacial acetic acid are added. At a temperature between −2° and −5° C., 10 ml. of an aqueous solution of NaOCl, containing 0.1305 g. of NaOCl per ml., are added dropwise. The mixture is left in the dark at 0° C. for 45 minutes, after which 35 ml. of water are added with careful mixing. The precipitated crystals are collected by filtration and dried, yielding 0.30 g. of (I).

Extracting the parent lye with 10 ml. of methylene chloride yields 0.14 g. of a mixture of (I) and (II), which on fractional crystallization from ethanol yields 0.03 g. of (I) and 0.11 g. of (II).

EXAMPLE 4

2.0 g. of a mixture of (I) and (II) are dissolved in 30 ml. of anhydrous ethanol. In the nitrogen atmosphere, a solution of 0.83 g. of $NaOC_2H_5$ in 30 ml. of anhydrous ethanol is added, and the mixture is refluxed for 15 minutes. The reaction mixture is concentrated to 10 ml., and 30 ml. of water are added with careful mixing. Cooling to 0° C., and filtering of the precipitated crystals, yields 1.90 g. of (II), melting at 236–238° C.

We claim:
1. An oxidation process which comprises oxidizing 7-chloro - 2-methyl-amino-4-hydroxy-5-phenyl-4, 5-dihydro-3H-1, 4-benzodiazepine and heating the oxidation product in alkaline solution to convert 7-chloro-2-methyl-amino - 5 - phenyl-5H-1, 4-benzodiazepine-4-oxide to 7-chloro-2-methylamino-5-phenyl-3H - 1,4 - benzodiazepine-4-oxide.

References Cited

Sternbach et al., J. Org. Chem., vol. 26, pages 1111–1118 (1961).

ALTON D. ROLLINS, Primary Examiner